(12) United States Patent
Gupta et al.

(10) Patent No.: US 11,163,636 B2
(45) Date of Patent: *Nov. 2, 2021

(54) CHRONOLOGICALLY ORDERED LOG-STRUCTURED KEY-VALUE STORE FROM FAILURES DURING GARBAGE COLLECTION

(71) Applicant: International Business Machines Corporation, Armonk, NY (US)

(72) Inventors: Aayush Gupta, San Jose, CA (US); Sangeetha Seshadri, Plano, CA (US)

(73) Assignee: International Business Machines Corporation, Armonk, NY (US)

( * ) Notice: Subject to any disclaimer, the term of this patent is extended or adjusted under 35 U.S.C. 154(b) by 47 days.

This patent is subject to a terminal disclaimer.

(21) Appl. No.: 16/795,396

(22) Filed: Feb. 19, 2020

(65) Prior Publication Data

US 2020/0183775 A1    Jun. 11, 2020

Related U.S. Application Data

(63) Continuation of application No. 15/904,180, filed on Feb. 23, 2018, now Pat. No. 10,642,680.

(51) Int. Cl.
*G06F 11/07* (2006.01)
*G06F 12/02* (2006.01)
*G06F 11/14* (2006.01)

(52) U.S. Cl.
CPC ........ *G06F 11/0793* (2013.01); *G06F 11/073* (2013.01); *G06F 11/0778* (2013.01); *G06F 11/1471* (2013.01); *G06F 11/1474* (2013.01); *G06F 12/0253* (2013.01)

(58) Field of Classification Search
CPC ............... G06F 11/0793; G06F 11/073; G06F 11/0778; G06F 11/1471; G06F 11/1474
See application file for complete search history.

(56) References Cited

U.S. PATENT DOCUMENTS

| 5,996,054 A | 11/1999 | Ledain et al. |
| 6,728,738 B2 | 4/2004 | Wolczko |

(Continued)

FOREIGN PATENT DOCUMENTS

| CN | 104063635 A | 9/2014 |
| CN | 105677297 A | 6/2016 |

OTHER PUBLICATIONS

Anonymous, "Crash-Consistent Clustered Storage System's Minimal Instruction Set Logging," Feb. 6, 2016, pp. 1-4, ip.com, United States.

(Continued)

*Primary Examiner* — Nadeem Iqbal
(74) *Attorney, Agent, or Firm* — Sherman IP LLP; Kenneth L. Sherman; Steven Laut (57) ABSTRACT

One embodiment provides a method for recovery from failures during garbage collection processing in a system including recording, by a processor, a specific offset within a garbage collection target slot of a log structure associated with a garbage collection transaction. Each transaction record of the garbage collection transaction includes a garbage collection target slot, a victim slot and a beginning offset in the garbage collection target slot.

20 Claims, 10 Drawing Sheets

(56) References Cited

U.S. PATENT DOCUMENTS

| | | | |
|---|---|---|---|
| 7,058,670 B2* | 6/2006 | Garthwaite | G06F 12/0269 707/815 |
| 7,200,623 B2 | 4/2007 | Chandrasekaran | |
| 7,747,565 B2 | 6/2010 | Harris | |
| 7,861,237 B2 | 12/2010 | Tarditi, Jr. | |
| 8,683,262 B1 | 3/2014 | Subbiah | |
| 8,880,787 B1 | 11/2014 | Kimmel | |
| 9,003,159 B2 | 4/2015 | Deshkar et al. | |
| 9,021,421 B1 | 4/2015 | Corry et al. | |
| 9,092,238 B2 | 7/2015 | Cavage | |
| 9,268,653 B2 | 2/2016 | Kimmel | |
| 9,400,816 B1 | 7/2016 | Gubarev | |
| 9,594,842 B2 | 3/2017 | Pope | |
| 9,697,267 B2 | 7/2017 | Kadayam | |
| 10,635,523 B2* | 4/2020 | Gupta | G06F 11/0778 |
| 10,642,680 B2* | 5/2020 | Gupta | G06F 11/0793 |
| 10,783,073 B2* | 9/2020 | Gupta | G06F 3/0643 |
| 2007/0136290 A1 | 6/2007 | Shinnar | |
| 2009/0210429 A1 | 8/2009 | Agrawal | |
| 2010/0332240 A1 | 12/2010 | Somuah | |
| 2012/0011106 A1 | 1/2012 | Reid et al. | |
| 2012/0102298 A1 | 4/2012 | Sengupta | |
| 2013/0019000 A1 | 1/2013 | Markus | |
| 2013/0036136 A1 | 2/2013 | Horii | |
| 2013/0086018 A1 | 4/2013 | Horii | |
| 2013/0117233 A1 | 5/2013 | Schreter | |
| 2013/0151892 A1 | 6/2013 | Huang | |
| 2014/0095452 A1 | 4/2014 | Lee et al. | |
| 2014/0136575 A1 | 5/2014 | Zhao | |
| 2014/0325115 A1 | 10/2014 | Ramsundar | |
| 2016/0110403 A1 | 4/2016 | Lomet | |
| 2016/0110408 A1 | 4/2016 | Madhavarapu | |
| 2016/0246830 A1 | 8/2016 | Chiu | |
| 2017/0068599 A1 | 3/2017 | Chiu | |
| 2017/0177617 A1 | 6/2017 | Johnson | |
| 2017/0228154 A1 | 8/2017 | Liu et al. | |
| 2018/0089034 A1 | 3/2018 | Chiu | |
| 2018/0239676 A1 | 8/2018 | Glebe et al. | |
| 2019/0057027 A1 | 2/2019 | D'Halluin et al. | |
| 2019/0196965 A1 | 6/2019 | Zhang et al. | |

OTHER PUBLICATIONS

Anonymous, "Method and System for Collecting Garbage of a Persistent Change Log of a Memory Data Structure," Mar. 24, 2014, pp. 1-2, ip.com, United States.

Anonymous, "Processing for Efficient Triggering of Soft Real-Time Java Garbage Collection to Optimize Throughput, Latency and Power Consumed," Jan. 29, 2011, pp. 1-3, ip.com, United States.

Anonymous, "Using a Change Stream that is not Completely Ordered in a Replication System that Depends on Receiving Changes in Chronological Order," Sep. 9, 2014, pp. 1-6, ip.com, United States.

Bailey, K. et al., "Exploring Storage Class Memory with Key Value Stores," INFLOW, Nov. 3, 2013, pp. 1-8, ACM, United States.

Hammer, D., "Filestream garbage collection with AlwaysOn Availability Groups.", SQL Hammer, Apr. 11, 2014, pp. 1-9, downloaded from: https://www.sqlhammer.com/filestream-garbage-collection-with-alwayson-availabilitygroups/.

IBM, "A Method for Improved Co-location of Objects in a Hierarchical Scanning Garbage Collector," Jan. 7, 2010, pp. 1-5, ip.com, United States.

IBM, "Method to Chronologically Store and Manage Information, Chronological Database," Jan. 4, 2006, pp. 1-3, ip.com, United States.

International Search Report and Written Opinion dated Jun. 26, 2019 for International Application PCT /IB2019/051323 from National Intellectual Property Administration, pp. 1-13, Beijing China.

International Search Report and Written Opinion dated Jun. 26, 2019 for International Application PCT /IB2019/051324 from National Intellectual Property Administration, pp. 1-9, Beijing China.

International Search Report and Written Opinion dated Jul. 3, 2019 for International Application PCT /IB2019/051325 from National Intellectual Property Administration, pp. 1-8, Beijing China.

Keen, J.S. et al., "Extended ephemeral logging: log storage management for applications with long lived transactions." ACM Transactions on Database Systems (TODS), vol. 22, No. 1, Mar. 1, 1997, pp. 1-42.

List of IBM Patents or Applications Treated as Related: Gupta, A. et al., U.S. Appl. No. 15/904,186, filed Feb. 23, 2018; Gupta, A. et al., U.S. Appl. No. 15/904,185, filed Feb. 23, 2018; Gupta, A. et al., U.S. Appl. No. 15/904,186, filed Feb. 23, 2018.

Lomet, D., et al., "Efficient Transparent Application Recovery in Client-Server Information Systems," SIGMOD, 1998, pp. 460-471, Seattle, WA.

Mell, P., et al., "The NIST Definition of Cloud Computing", National Institute of Standards and Technology Special Publication 800-145, Sep. 2011, pp. 1-7, U.S. Department of Commerce, United States.

Response to United Kingdom Examination Report filed Jan. 14, 2021 for UK Patent Application No. GB2013416.9 submitted to the UK Intellectual Property Office (IPO), pp. 1-4, Portsmouth, Hampshire, United Kingdom.

United Kingdom Examination Report dated Oct. 2, 2020 for UK Patent Application No. GB2013416.9 from Intellectual Property Office (IPO), pp. 1-5, South Wales, United Kingdom.

German Office Action dated Jun. 16, 2021 for DE Patent Application No. 112019000401.8 from German Patent and Trademark Office, pp. 1-7, Munich, Germany (English-language translation included on pp. 1-3).

German Office Action dated Jun. 8, 2021 for DE Patent Application No. 112019000399.2 from German Patent and Trademark Office, pp. 1-12, Munich, Germany (English-language translation included on pp. 1-7).

* cited by examiner

CHRONOLOGICALLY ORDERED LOG-STRUCTURED KEY-VALUE STORE FROM FAILURES DURING GARBAGE COLLECTION

BACKGROUND

Typical log-structured storage systems store record data in temporal order in a "log." These typical systems allow basic primitive operations, such as insert, update, delete, read. Each update of data results in a new record being inserted at the tail of the "log." Each delete results in a tombstone object being inserted at the tail of the log. Additionally, a background garbage collection (GC) process compacts the data reclaiming space that does not contain valid data.

SUMMARY

Embodiments relate to proper recovery from failures during garbage collection in a chronologically ordered log-structured key-value store. One embodiment provides a method for recovery from failures during garbage collection in a chronologically ordered log-structured key-value store including recording, by a processor, a specific offset within a garbage collection target slot of a log structure associated with a garbage collection transaction. Each transaction record of the garbage collection transaction includes a garbage collection target slot, a victim slot and a beginning offset in the garbage collection target slot.

These and other features, aspects and advantages of the embodiments will become understood with reference to the following description, appended claims and accompanying figures.

DETAILED DESCRIPTION

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments of the embodiments are capable of being implemented in conjunction with any other type of computing environment now known or later developed.

One or more embodiments relate to proper recovery from failures during garbage collection (GC) in a chronologically ordered log-structured key-value store. One embodiment provides a method for recovery from failures during GC in a chronologically ordered log-structured key-value store including performing, by a processor, chronological GC transactionally. A specific offset within a target slot of a log structure associated with the GC transaction is recorded. Records are skipped from an initial offset in the target slot of the log structure recorded by the garbage collection transaction until an end of the target slot.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Figure 1:
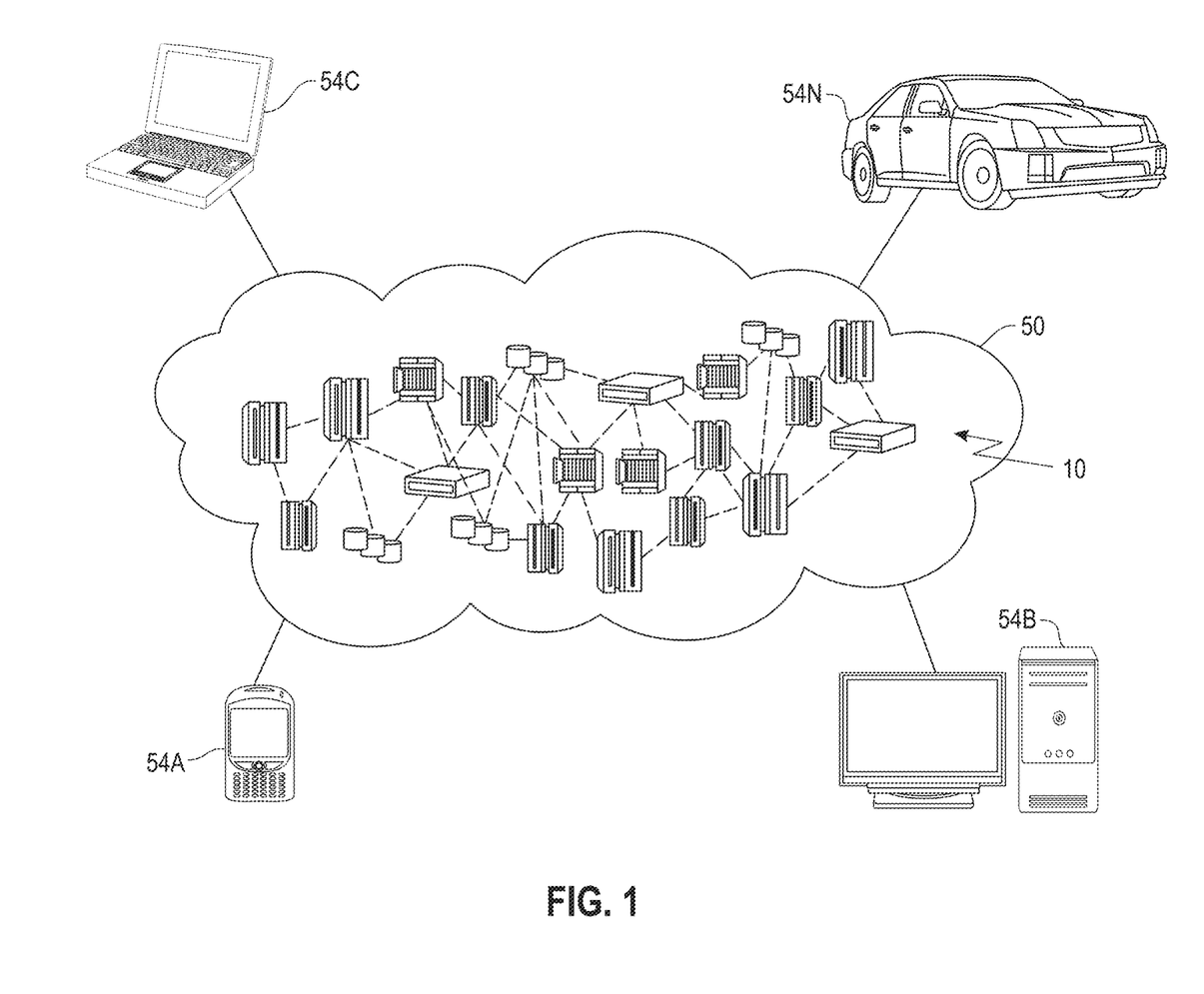
FIG. 1 depicts a cloud computing environment, according to an embodiment.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 2:
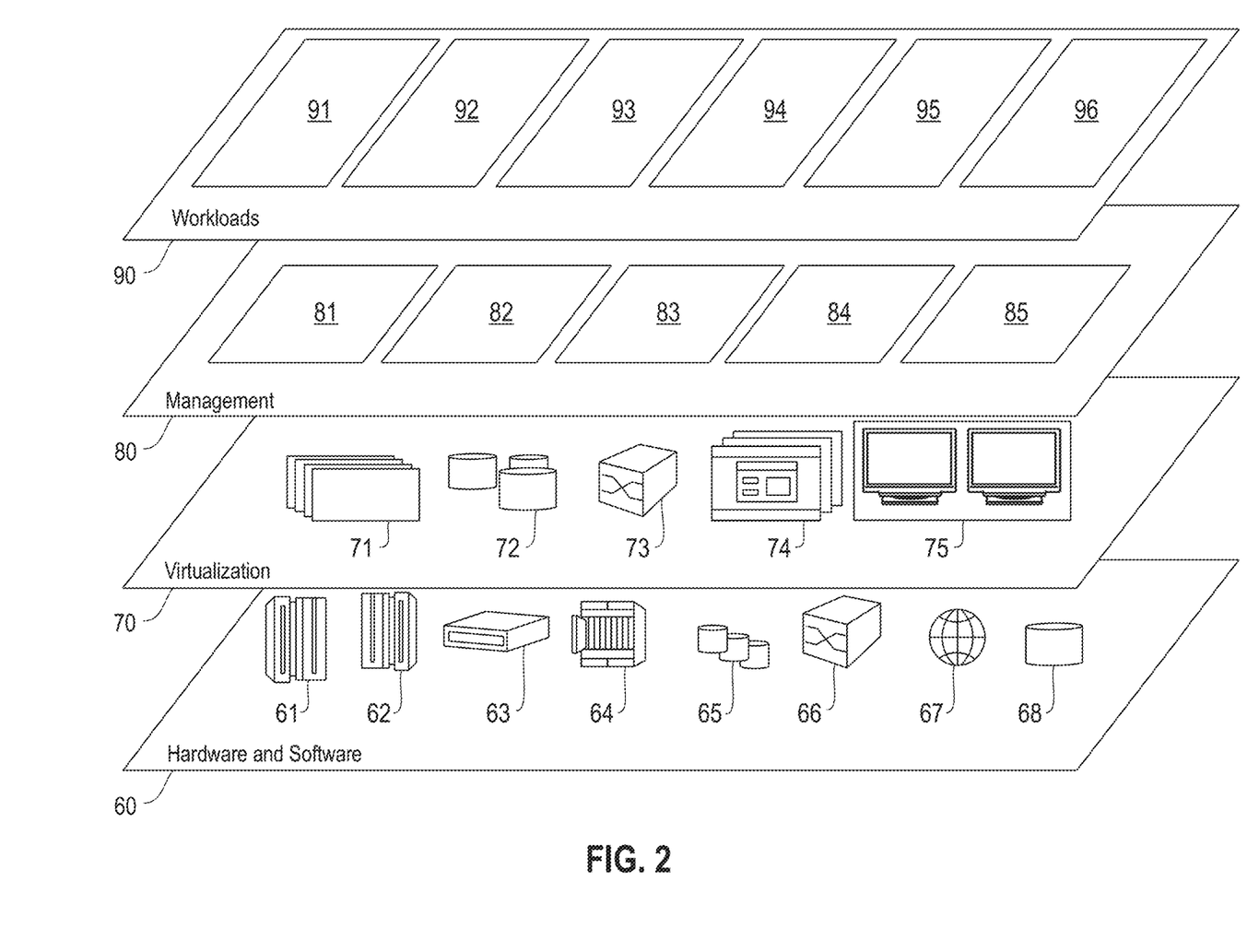
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and the embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and recovery from failures during GC in a chronologically ordered log-structured key-value store processing 96. As mentioned above, all of the foregoing examples described with respect to FIG. 2 are illustrative only, and the embodiments are not limited to these examples.

It is understood all functions of one or more embodiments as described herein may be typically performed by the processing system 300 (FIG. 3) or the autonomous cloud environment 410 (FIG. 4), which can be tangibly embodied as hardware processors and with modules of program code. However, this need not be the case for non-real-time processing. Rather, for non-real-time processing the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments may be implemented with any type of clustered computing environment now known or later developed.

Figure 3:
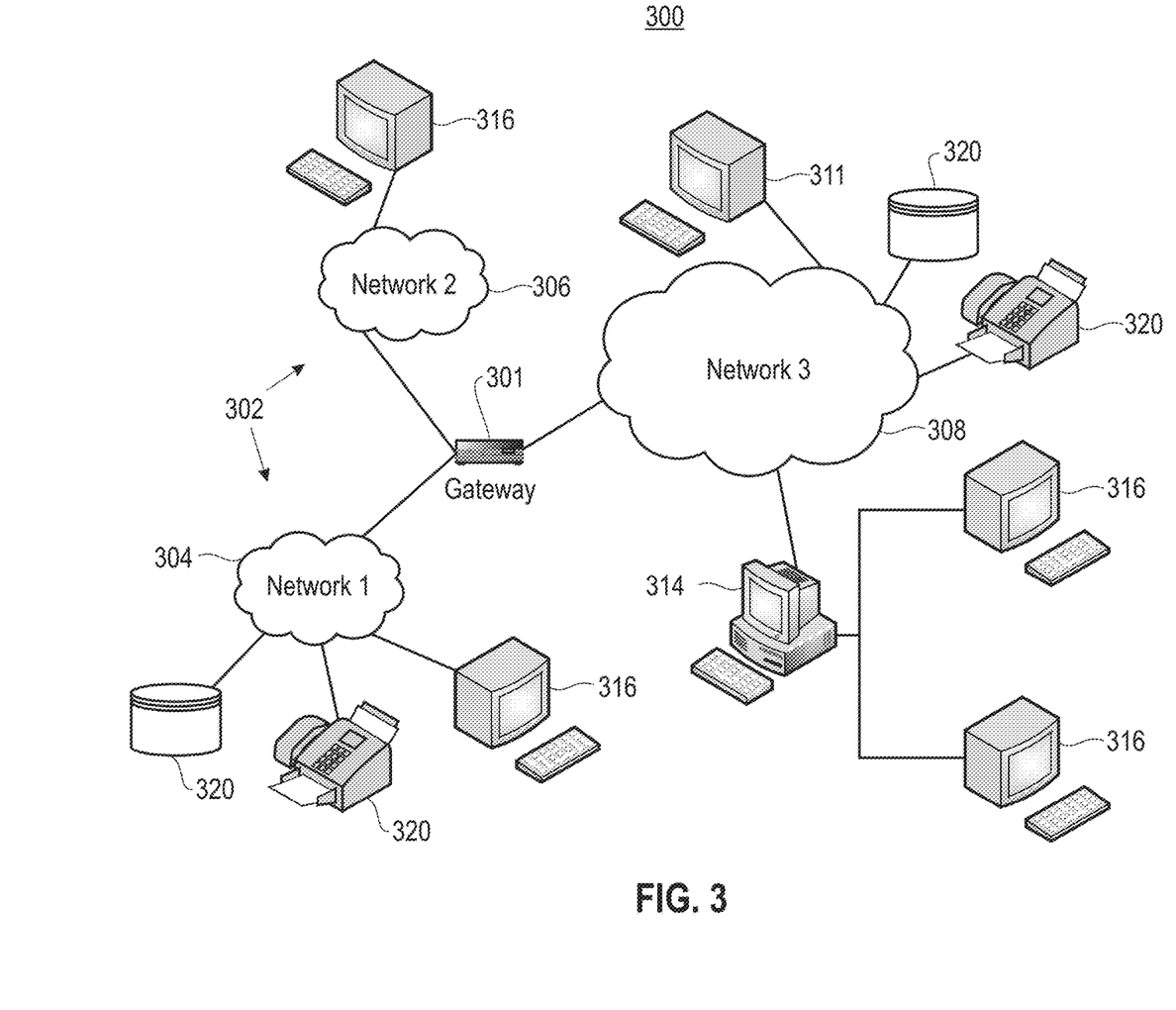
FIG. 3 is a network architecture for retrospective snapshots in log-structured storage systems, according to an embodiment.

FIG. 3 illustrates a network architecture 300, in accordance with one embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 311 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

Figure 4:
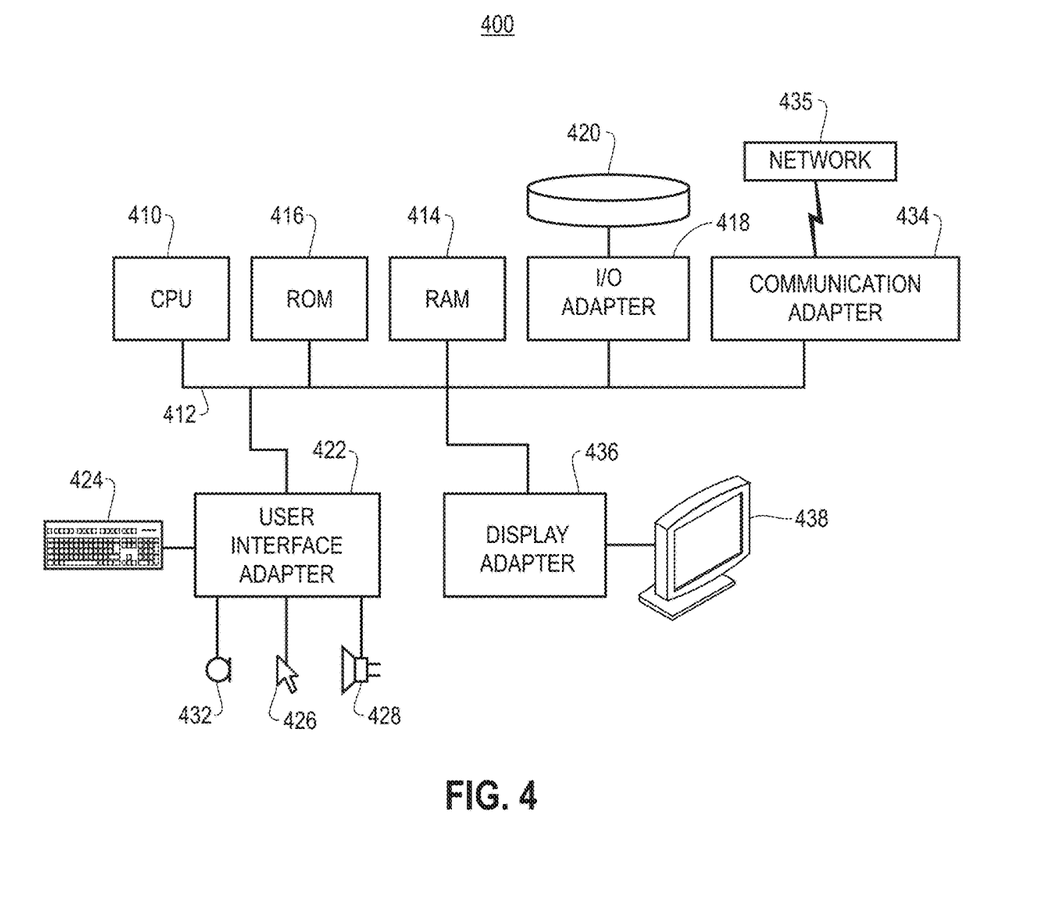
FIG. 4 shows a representative hardware environment that may be associated with the servers and/or clients of FIG. 1, according to an embodiment.

FIG. 4 shows a representative hardware system 400 environment associated with a user device 416 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OS, a UNIX OS, etc. In one embodiment, the system 400 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

Figure 5:
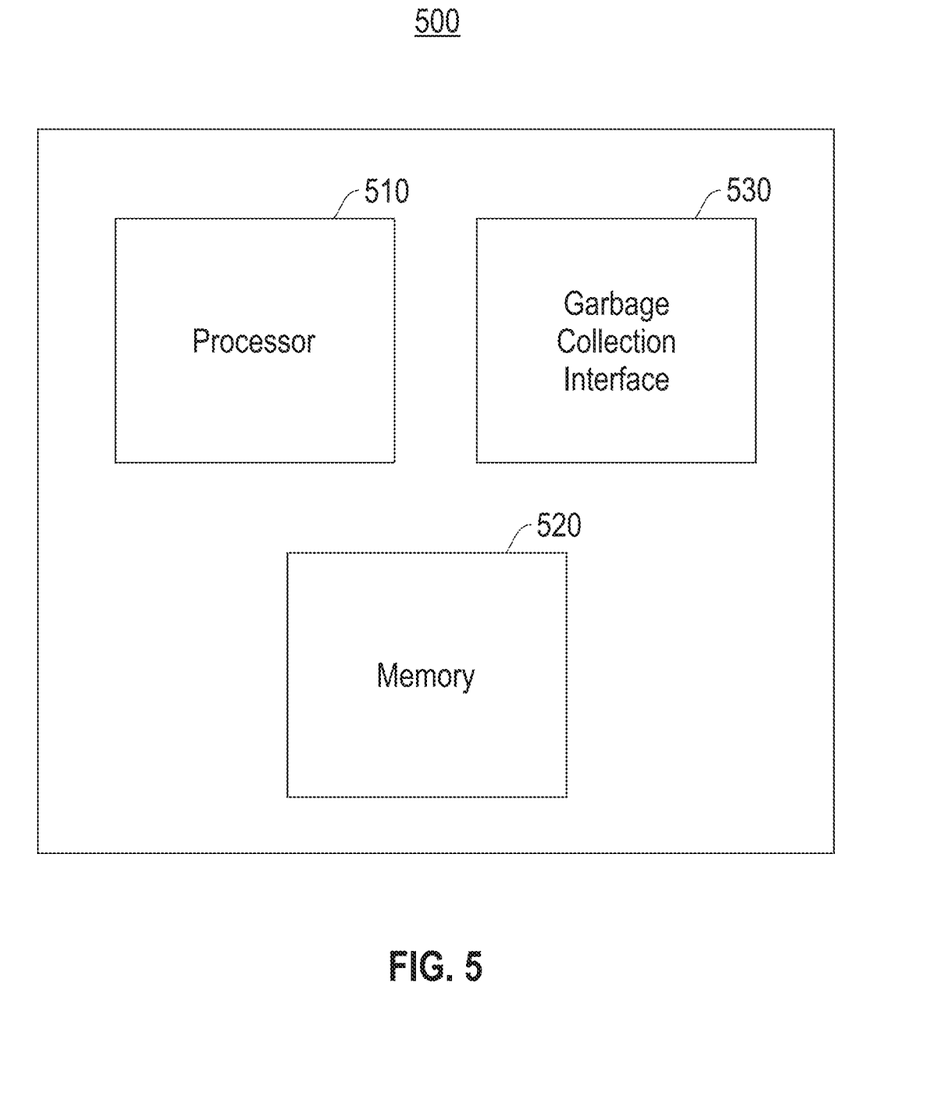
FIG. 5 is a block diagram illustrating a processor for recovery from failures during garbage collection in a chronologically ordered log-structured key-value store in log-structured storage systems, according to an embodiment.

FIG. 5 is a block diagram illustrating a processing node 500 for recovery from failures during GC in a chronologically ordered log-structured key-value store in log-structured storage systems, according to an embodiment. The term "garbage collection" (GC) refers to reclaiming "disk space" occupied by stale entries in the log. For example, when a record is inserted, an entry is added to the tail of the log. When the same record is deleted, a tombstone entry is added to the tail of the log. The tombstone entry refers to the original location of the data on disk as created by the insert. The disk space occupied by the original inserted record may be garbage collected (provided the system is not maintaining older versions). Stale data may be the result of records that have been deleted or updated. Updates result in stale data because older versions of the data that are maintained in the log are no longer needed. Note that in a log-structured store, every insert, update or delete operation results in a record being inserted at the tail of the log.

In one embodiment, the processing node 500 includes one or more processors 510, a garbage collection interface 530 and a memory 520. In one embodiment, each processor(s) 510 performs processing for recovery from failures during GC in a chronologically ordered log-structured key-value store in log-structured storage systems.

In one embodiment, when processing node 500 in a log-structured storage system recovers from a failure, the in-memory index needs to be reconstructed. To do so, the log in memory 520 is replayed from the beginning until the tail. If failure occurs during the middle of a GC operation, clean-up is required. The clean-up may be performed by the processor 510 and garbage collection interface 530 immediately or can be done eventually at a delayed time. Without cleanup, additional garbage is generated, which needs to be handled eventually and may impact recovery time. Clean-up must take into consideration any "dirty-reads." Update(s)/Delete(s) operations that may have occurred during the GC operation: may point to the "garbage collection target slot." Therefore GC rollback must "fix" broken chains in addition to rolling back content on the target slot.

In one embodiment, GC is performed by the garbage collection interface 530 as a transaction. Transaction processing divides information processing into individual, indivisible operations known as transactions. Each transaction must succeed or fail as a complete unit, and can never be only partially complete. In one embodiment, the garbage collection interface 530 performs rollback of a GC transaction in case of failure. GC transaction records include: <target slot (TS), victim slot (VS), begin offset in target slot (BO)>. In one embodiment, the GC target region is the <BO, end of slot> region on the GC target slot. GC transaction records begin and end on the GC transaction.

In one embodiment, the garbage collection interface 530 performs GC rollback as follows. The garbage collection interface 530 reads the recovery log to identify an incomplete GC target slot and victim slot. The garbage collection interface 530 begins index reconstruction such that: 1) if a slot is GC target slot & offset >=BO, skip until end of slot and continue to next slot; 2) if a record (update or delete) points (back-pointer) to a GC target region: a) read location pointed to in the GC target region; b) insert a new tombstone entry to preserve a back-pointer (points to previous address) in the record in the GC target region. Next, the garbage collection interface 530 ends index reconstruction, zeros-out a target slot TS from offset BO until the end of the slot, and inserts an "Abort record for the garbage collection transaction" into the recovery log. At the end of the recovery, the system state is identical to the state of the system before GC processing.

Figure 6:
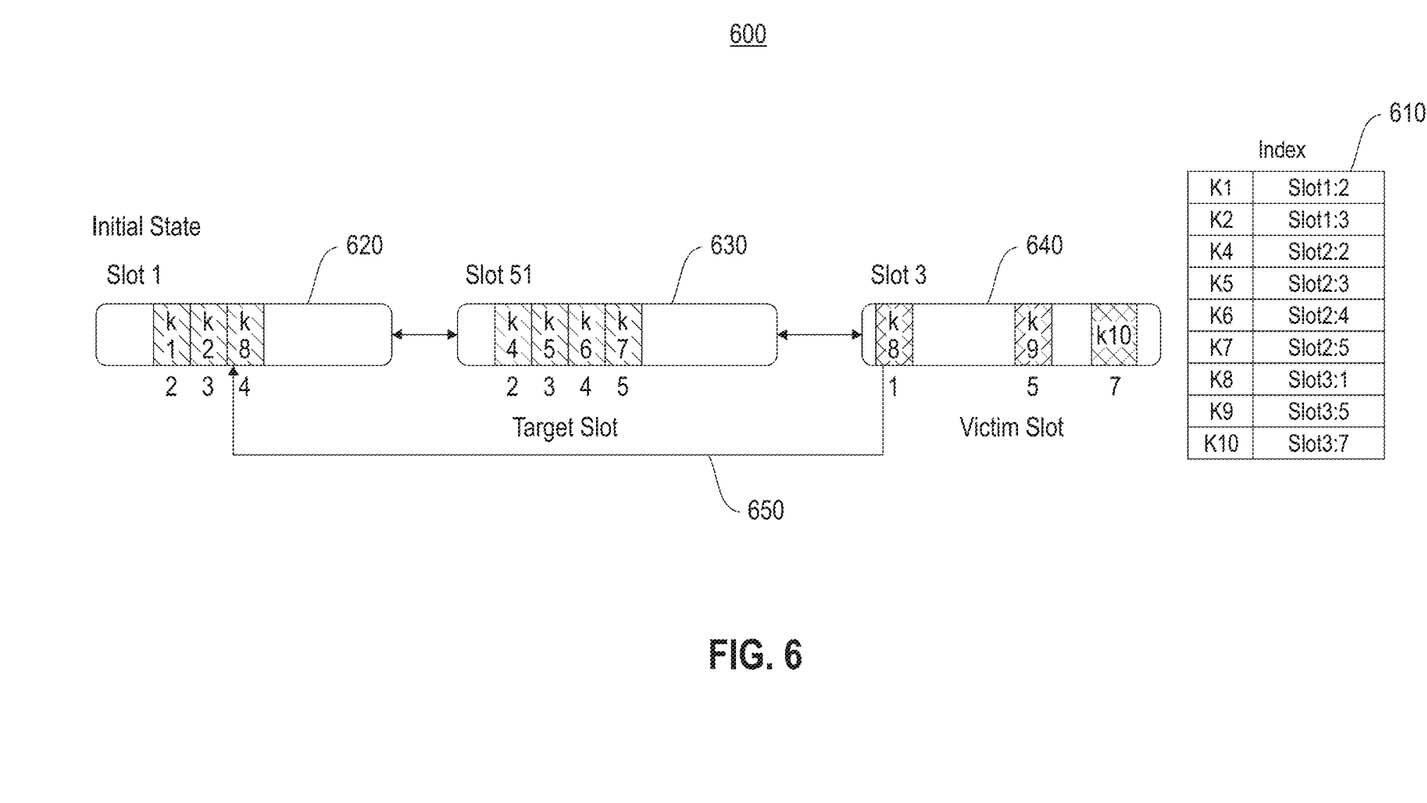
FIG. 6 illustrates an initial system state during garbage collection, according to an embodiment.

FIG. 6 illustrates an example 600 initial system state during GC, according to an embodiment. The index 610 is shown on the right-side of the example 600, and includes keys in the left column and slot mapping in the right column. In one example, K1 refers to slot 1 620 and offset 2; K2 refers to slot 1 620 and offset 3, etc. In the example 600, the slots shown include slot 1 620, slot 51 630 and slot 3 640. The victim slot VS is shown as slot 3 640, and the target slot TS is shown as slot 51 630. The back-pointer chain 650 shows the pointer from slot 3 640 k8 to slot 1 620 k8.

Figure 7:
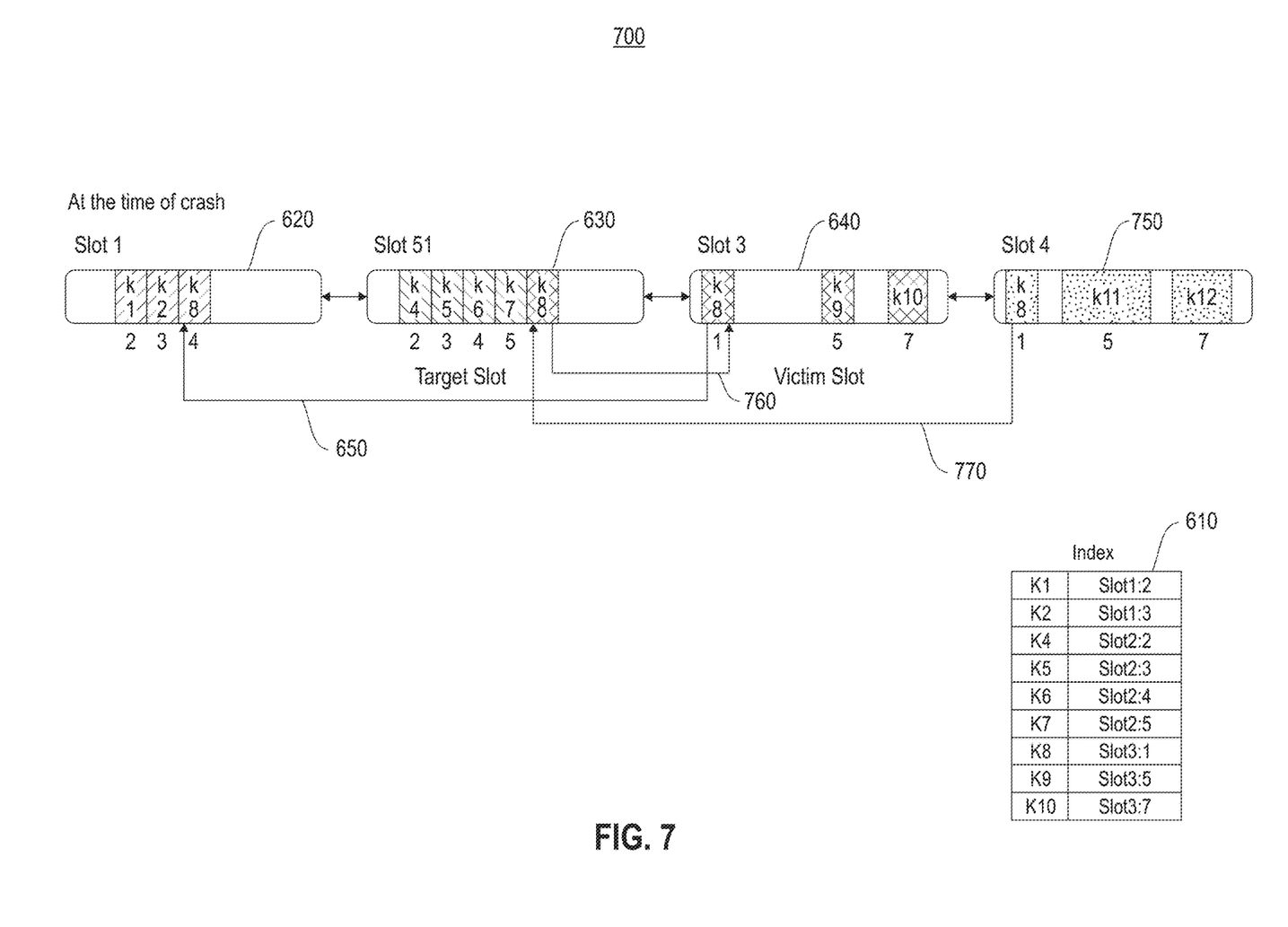
FIG. 7 illustrates a system state at a time of a system crash during garbage collection, according to an embodiment.

FIG. 7 illustrates an example 700 system state at a time of a system crash during GC, according to an embodiment. In the example 700, slot 4 750 shows kl8 and back-pointer chain 770 pointing to slot 51 630, and k8 in slot 51 630 with forward-pointer chain 760 pointing to slot 3 640 and offset 1.

Figure 8:
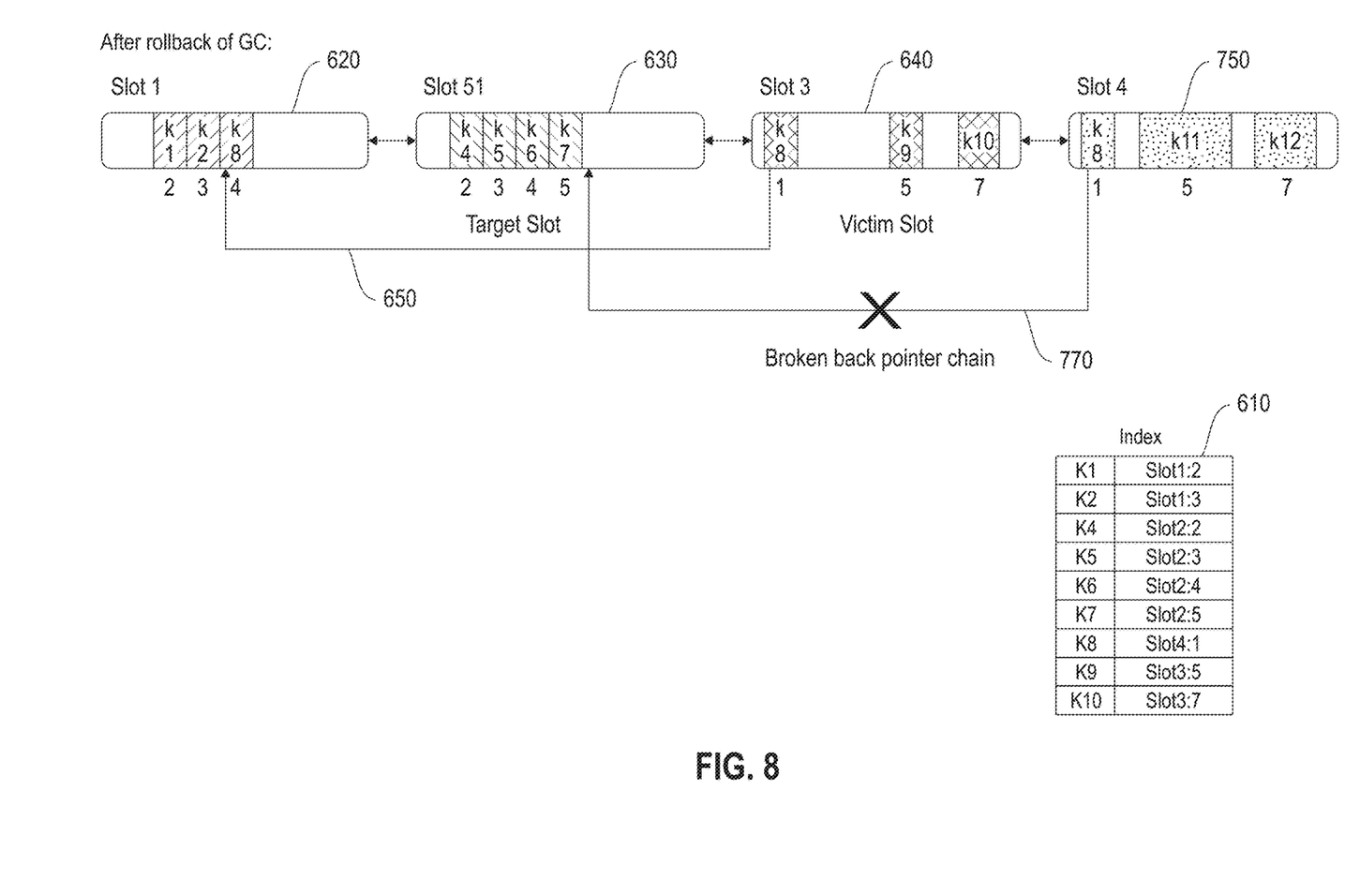
FIG. 8 illustrates a system state after rollback of garbage collection, according to an embodiment.

FIG. 8 illustrates an example 800 for system state after rollback of GC, according to an embodiment. As shown, the back-pointer chain 770 is broken from slot 5 750 to slot 51 630.

Figure 9:
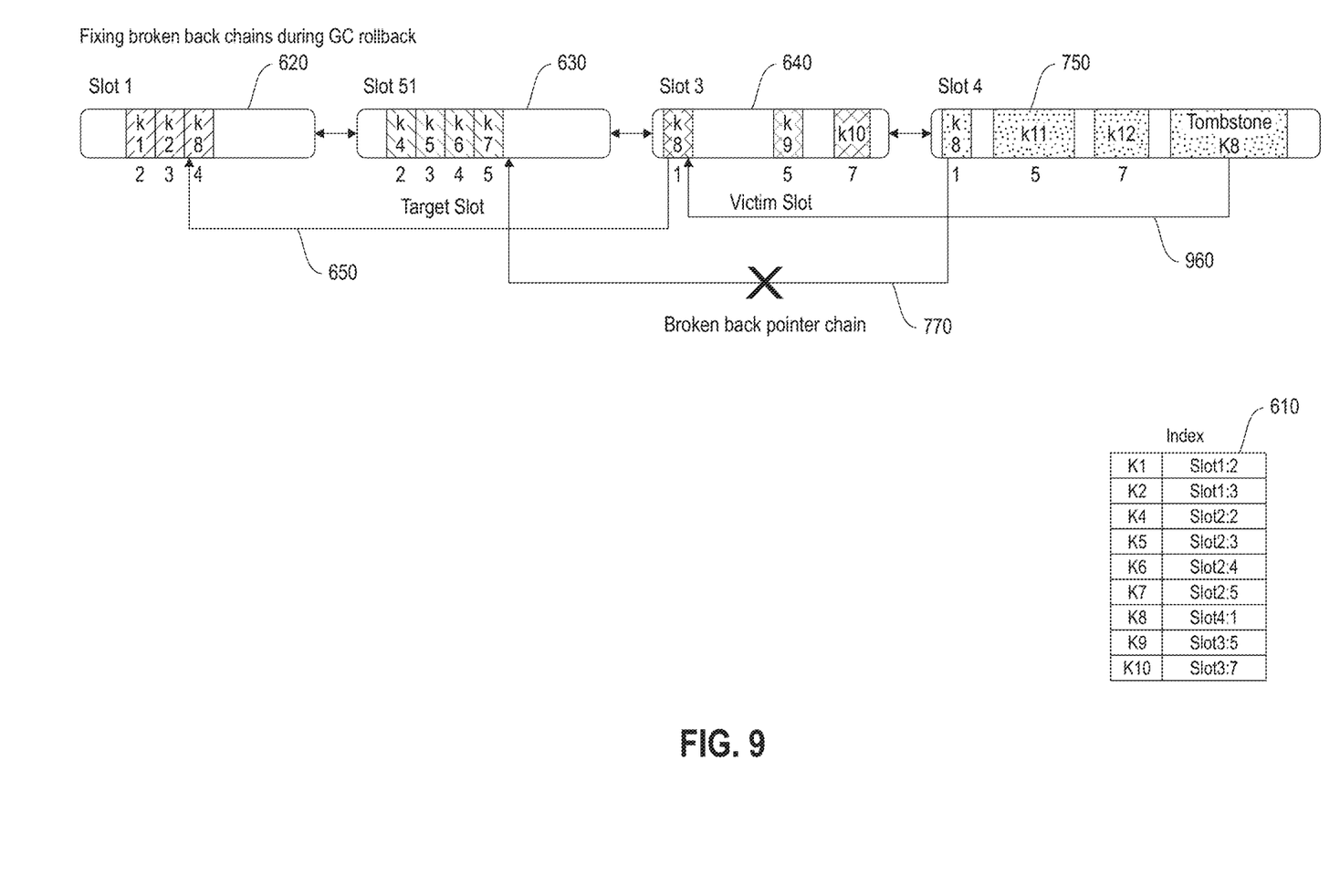
FIG. 9 illustrates a system state fixing broken back chains during garbage collection rollback, according to an embodiment.

FIG. 9 illustrates an example 900 for system state fixing broken back chains during GC rollback, according to an embodiment. As shown, the back-pointer chain 770 is broken. In the example 900, to fix the broken back chain 770, tombstone K8 in slot 4 750 has added a back-pointer chain 960 pointing to slot 3 640, offset 1.

Figure 10:
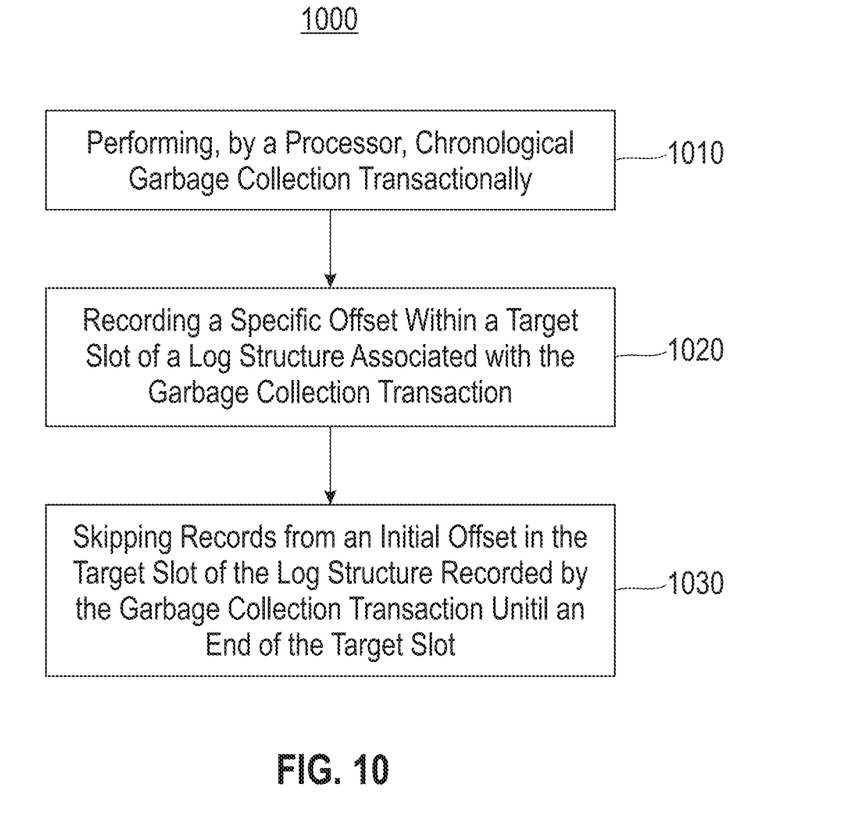
FIG. 10 illustrates a block diagram for a process for recovery from failures during garbage collection in a chronologically ordered log-structured key-value store, according to one embodiment.

FIG. 10 illustrates a block diagram for a process 1000 for recovery from failures during GC in a chronologically ordered log-structured key-value store, according to one embodiment.

In one embodiment, block 1010 in process 1000 includes performing, by a processor (e.g., by a processor 510, FIG. 5), chronological GC transactionally. In block 1020, process 1000 records a specific offset within a target slot (TS) of a log structure associated with the GC transaction. In block 1030, process 1000 skips records from an initial offset in the TS of the log structure recorded by the GC transaction until an end of the TS.

In one embodiment, in process 1000 the system may be a chronologically ordered log-structured key-value store system. In one embodiment, process 1000 may further include recording the GC transaction on a separate recovery log. Process 1000 may additionally include zeroing out the region of the TS of the log structure associated with an incomplete GC operation (e.g., a failed transaction). In one embodiment, process 1000 may include aborting the GC transaction by writing an abort record in a recovery log.

In one embodiment, process 1000 may include providing for update operations to proceed concurrently with GC in a log-structured key-value store while maintaining chronological order by restoring the system to a consistent state after failure during GC.

In one embodiment, process 1000 may include providing for delete operations to proceed concurrently with GC in the log-structured key-value store while maintaining chronological order by restoring the system to a consistent state after failure during GC.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments are described below with reference to flowchart illustrations and/or block diagrams of methods, apparatus (systems) and computer program products according to the embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the various embodiments with various modifications as are suited to the particular use contemplated.

What is claimed is:

1. A method for recovery from failures during garbage collection processing in a system, comprising:
   recording, by a processor, a specific offset within a garbage collection target slot of a log structure associated with a garbage collection transaction,
   wherein each transaction record of the garbage collection transaction including a garbage collection target slot, a victim slot and a beginning offset in the garbage collection target slot.

2. The method of claim 1, further comprising:
   performing, by the processor, chronological garbage collection transactionally;
   wherein the system comprises a chronologically ordered log-structured key-value store system, and each garbage collection transaction succeeds or fails as a complete unit.

3. The method of claim 2, further comprising:
   skipping records from an initial offset in the garbage collection target slot of the log structure recorded by the garbage collection transaction until an end of the garbage collection target slot.

4. The method of claim 3, further comprising:
   recording the garbage collection transaction on a separate recovery log, wherein a garbage collection target region is the beginning offset in the garbage collection target slot to the end of the garbage collection target slot.

5. The method of claim 4, further comprising:
   inserting a new tombstone entry to preserve a back-pointer in a transaction record in the garbage collection region; and
   zeroing out the garbage collection target region of the garbage collection target slot of the log structure associated with an incomplete garbage collection operation.

6. The method of claim 5, further comprising:
aborting the garbage collection transaction by writing an abort record in a recovery log.

7. The method of claim 3, further comprising:
performing update operations concurrently with garbage collection in a log-structured key-value store while maintaining chronological order by restoring the system to a consistent state after failure during garbage collection; and
performing delete operations concurrently with garbage collection in the log-structured key-value store while maintaining chronological order by restoring the system to a consistent state after failure during garbage collection.

8. A computer program product for recovery from failures during garbage collection processing in a system, the computer program product comprising a non-transitory computer readable storage medium having program instructions embodied therewith, the program instructions executable by a processor to cause the processor to:
record, by the processor, a specific offset within a garbage collection target slot of a log structure associated with a garbage collection transaction,
wherein each transaction record of the garbage collection transaction including a garbage collection target slot, a victim slot and a beginning offset in the garbage collection target slot.

9. The computer program product of claim 8, further comprising program instructions executable by the processor to cause the processor to:
perform, by the processor, chronological garbage collection transactionally;
wherein the system comprises a chronologically ordered log-structured key-value store system, and each garbage collection transaction succeeds or fails as a complete unit.

10. The computer program product of claim 9, further comprising program instructions executable by the processor to cause the processor to:
skip, by the processor, records from an initial offset in the garbage collection target slot of the log structure recorded by the garbage collection transaction until an end of the garbage collection target slot.

11. The computer program product of claim 10, further comprising program instructions executable by the processor to cause the processor to:
record, by the processor, the garbage collection transaction on a separate recovery log, wherein a garbage collection target region is the beginning offset in the garbage collection target slot to the end of the garbage collection target slot.

12. The computer program product of claim 11, further comprising program instructions executable by the processor to cause the processor to:
insert, by the processor, a new tombstone entry to preserve a back-pointer in a transaction record in the garbage collection region; and
zero out, by the processor, the garbage collection target region of the garbage collection target slot of the log structure associated with an incomplete garbage collection operation.

13. The computer program product of claim 12, further comprising program instructions executable by the processor to cause the processor to:
abort, by the processor, the garbage collection transaction by writing an abort record in a recovery log.

14. The computer program product of claim 11, further comprising program instructions executable by the processor to cause the processor to:
perform, by the processor, update operations concurrently with garbage collection in a log-structured key-value store while maintaining chronological order by restoring the system to a consistent state after failure during garbage collection; and
perform, by the processor, delete operations concurrently with garbage collection in the log-structured key-value store while maintaining chronological order by restoring the system to a consistent state after failure during garbage collection.

15. An apparatus comprising:
a memory storing instructions; and
a processor executing the instructions to:
record a specific offset within a garbage collection target slot of a log structure associated with a garbage collection transaction, wherein each transaction record of the garbage collection transaction including a garbage collection target slot, a victim slot and a beginning offset in the garbage collection target slot;
wherein the processor recovers from failures that occur during garbage collection processing in a system.

16. The apparatus of claim 15, wherein the processor further executes instructions to:
perform chronological garbage collection transactionally.

17. The apparatus of claim 16, wherein the processor further executes instructions to:
skip records from an initial offset in the garbage collection target slot of the log structure recorded by the garbage collection transaction until an end of the garbage collection target slot;
wherein the system comprises a chronologically ordered log-structured key-value store system, and each garbage collection transaction succeeds or fails as a complete unit.

18. The apparatus of claim 17, wherein the processor further executes instructions to:
record the garbage collection transaction on a separate recovery log wherein a garbage collection target region is the beginning offset in the garbage collection target slot to the end of the garbage collection target slot.

19. The apparatus of claim 18, wherein the processor further executes instructions to: insert a new tombstone entry to preserve a back-pointer in a transaction record in the garbage collection region; and
zero out the garbage collection target region of the garbage collection target slot of the log structure associated with an incomplete garbage collection operation.

20. The apparatus of claim 19, wherein the processor further executes instructions to:
abort the garbage collection transaction by writing an abort record in a recovery log;
perform update operations concurrently with garbage collection in a log-structured key-value store while maintaining chronological order by restoring the system to a consistent state after failure during garbage collection; and
perform delete operations concurrently with garbage collection in the log-structured key-value store while maintaining chronological order by restoring the system to a consistent state after failure during garbage collection.

* * * * *